United States Patent [19]

Peterson et al.

[11] Patent Number: 4,839,848
[45] Date of Patent: Jun. 13, 1989

[54] FAST MULTIPLIER CIRCUIT INCORPORATING PARALLEL ARRAYS OF TWO-BIT AND THREE-BIT ADDERS

[75] Inventors: LuVerne R. Peterson, San Diego; Michael A. Rehart, El Toro, both of Calif.

[73] Assignee: Unisys Corporation, Detroit, Mich.

[21] Appl. No.: 95,950

[22] Filed: Sep. 14, 1987

[51] Int. Cl.$^4$ .............................................. G06F 7/52
[52] U.S. Cl. ................................................... 364/757
[58] Field of Search ......................... 364/754, 757–760

[56] References Cited

U.S. PATENT DOCUMENTS

| | | | |
|---|---|---|---|
| 3,670,956 | 6/1972 | Calhoun | 364/758 |
| 4,598,382 | 7/1986 | Sato | 364/757 |
| 4,706,210 | 11/1987 | Snelling et al. | 364/758 |

Primary Examiner—Gary V. Harkcom
Assistant Examiner—Long Than Nguyen
Attorney, Agent, or Firm—Charles J. Fassbender; Kenneth L. Miller

[57] ABSTRACT

A multiplier circuit is comprised of multiple arrays of logic cells. Each array has input lines for receiving two multibit binary numbers that are to be multiplied together; and each logic cell includes an AND gate for producing single power product terms by multiplying together one bit from each of the two numbers. These cells are arranged in the arrays such that the total quantity of single power product terms of any particular power in the respective arrays is within 30% of each other. One subset of cells of each array also includes a respective two-bit adder, and another subset of cells of each array includes a respective three-bit adder. These two-bit and three-bit adders are interconnected within each array to form an intermediate result, in parallel with the other arrays, which consists of a partial sum of all product terms in the array together with no more than one remaining carry-in for each bit of that partial sum. All of these intermediate results are then added by parallel input adders to produce the product of the two numbers.

10 Claims, 3 Drawing Sheets

FAST MULTIPLIER CIRCUIT INCORPORATING PARALLEL ARRAYS OF TWO-BIT AND THREE-BIT ADDERS

BACKGROUND OF THE INVENTION

This invention relates to circuits for multiplying two multibit binary numbers together.

Basically, two multibit binary numbers can be expressed mathematically as $X_n + \ldots + X_1 + X_0$ and $Y_n + \ldots + Y_1 + Y_0$. In this expression, $X_0$ is the bit of power 0 in the number X; $Y_0$ is the bit of power 0 in the number Y; $X_1$ is the bit of power 1 in the number X; etc. And, to form the product of the two numbers X and Y, each bit in the number X must be multiplied by all of the bits in the number Y to thereby form a plurality of single power product terms. Then, all of the single power product terms must be added together.

One prior art multiplier circuit which forms and adds the single power product terms in a serial fashion, one term at a time, is described at page 340 of the textbook *Principles of CMOS VLSI Design* by N. West and K. Eshraghian, 1985, from Addison-Wesley. That reference, at page 345, also describes a faster prior art multiplier circuit which forms and adds the single power product terms by means of one large array of two-bit and three-bit adders. However, both of these multiplier circuits are still too slow for many applications-such as high speed real time signal processing.

Accordingly, a primary object of the invention is to provide a multiplier circuit which has a novel architecture whereby products are formed very quickly.

BRIEF SUMMARY OF THE INVENTION

In accordance with one preferred embodiment of the invention, a circuit for multiplying two multibit binary numbers X and Y together, comprises a first array of a plurality of logic cells and a second array of a plurality of logic cells. Each of these arrays has inputs for receiving the bits of the two numbers X and Y. Also, every logic cell includes a two-input AND gate which produces a single power product term by multiplying one bit of the number X with one bit of the number Y. These AND gates are arranged such that the total quantity of product terms of any particular power in the first array is within one of the total quantity of product terms of the same power in the second array.

Further, one subset of the cells in both arrays includes a respective two-bit adder, and another subset of the cells in both arrays includes a respective three-bit adder. These adders and the AND gates are interconnected within each array such that each array produces an intermediate result which is a partial sum of all the product terms in an array together with no more than one carry-in for each bit of that partial sum.

Three parallel input adders then combine the intermediate results from both arrays to produce the product of the numbers X and Y. Specifically, one parallel input adder produces a complete sum of the intermediate result from the first array; another parallel input adder produces a complete sum of the intermediate result from the second array; and another parallel input adder adds those two sums together.

BRIEF DESCRIPTION OF THE DRAWINGS

Various features and advantages of the invention are described herein in conjunction with the accompanying drawings wherein.

DETAILED DESCRIPTION OF THE INVENTION

Figure 1:
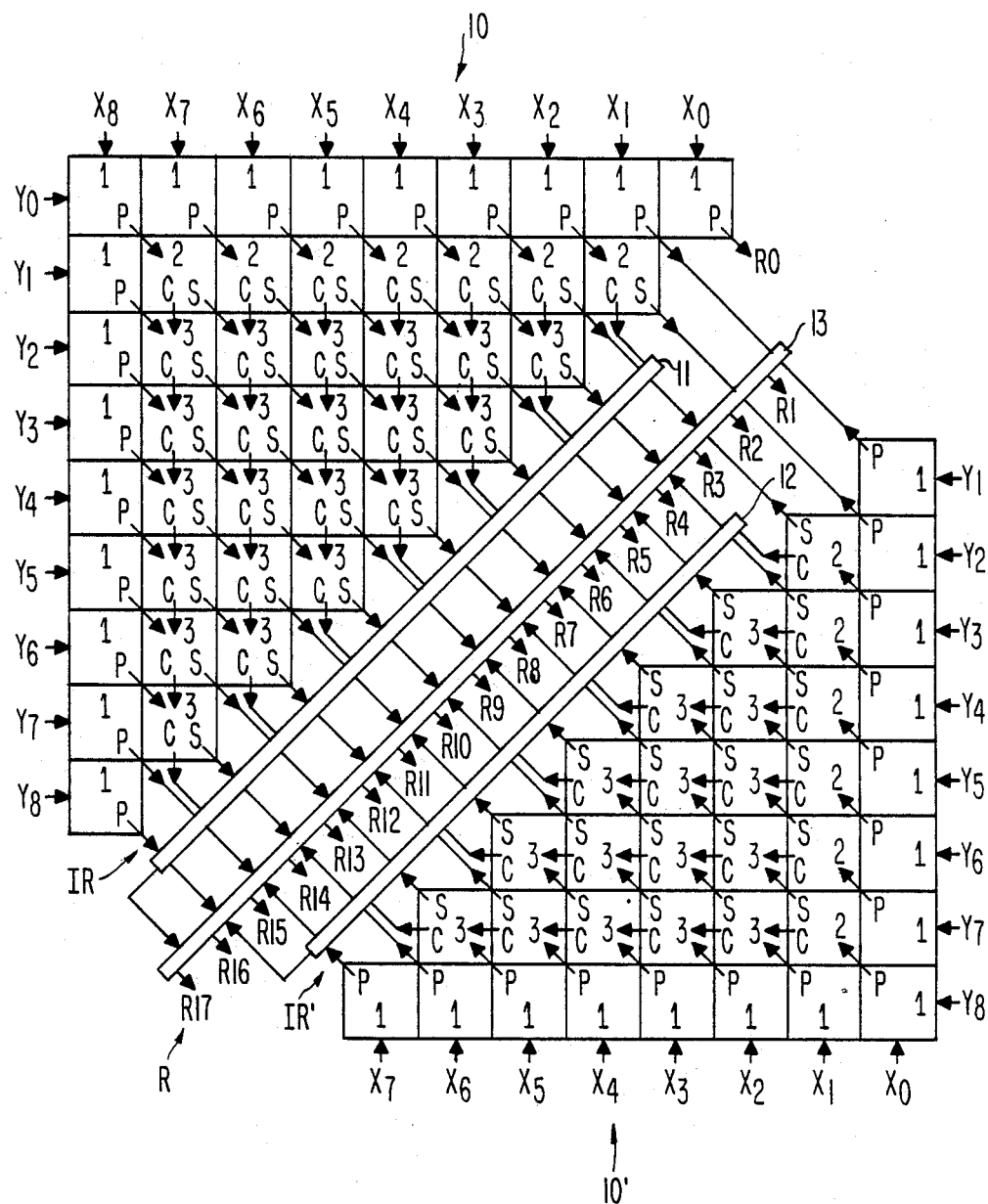
FIG. 1 illustrates one preferred embodiment of the invention.

Referring now to FIG. 1, a preferred embodiment of the invention will be described. This embodiment includes an array 10 of a plurality of logic cells each of which is labeled 1, 2, or 3; and it includes another array 10' of a plurality of logic cells each of which is also labeled 1, 2, or 3. Each logic cell 1 is a two-bit multiplier; each logic cell 2 is a two-bit multiplier and a two-bit adder; and each logic cell 3 is a two-bit multiplier and a three-bit adder.

All of the cells of the arrays 10 and 10' are arranged on a single semiconductor chip in rows and columns that form two triangular shaped patterns which are spaced apart from one another. In array 10, signals $X_0$ thru $X_8$ run through respective columns of the cells while signals $Y_0$ thru $Y_8$ run through respective rows of the cells. Similarly, in array 10', signals $X_0$ thru $X_7$ run through respective columns of the cells while signals $Y_1$ thru $Y_8$ run through respective rows of the cells.

Signals $X_0$ thru $X_8$ and signals $Y_0$ thru $Y_8$ represent the bits of two multibit binary numbers X and Y that are to be multiplied together. Specifically, signal $X_0$ represents the bit of power 0 in number X; signal $Y_0$ represents the bit of power 0 in number Y; signal $X_1$ represents the bit of power 1 in number X; etc.

Each two-bit multiplier in the arrays forms a product term of a single power by multiplying the X bit and Y bit which pass through the cell. Thus, for example, the cell in array 10 which receives signals $X_0$ and $Y_0$ produces the product term $X_0Y_0$ which is of power 0; the cell in array 10 which receives signals $X_1$ and $Y_0$ produces the product term $X_1Y_0$ which is of power 1; etc. Suitably, the two-bit multiplier in each cell which forms a product is a simple AND gate.

With the above described arrays, all of the single power product terms are formed that are needed to produce the complete product of the two numbers X and Y. Further, the cells are arranged such that the total quantity of product terms of any particular power in array 10 is within one of the total quantity of product terms of the same power in array 10'.

For example, array 10 forms a total of five product terms of power 8 (namely-$X_8Y_0$, $X_7Y_1$, $X_6Y_2$, $X_5Y_3$ and $X_4Y_4$) whereas array 10' forms a total of four product terms of power 8 (namely-$X_0Y_8$, $X_1Y_7$, $X_2Y_6$, and $X_3Y_5$). This can be seen by simply following the X and Y signals through the rows and columns. As another example, array 10 forms three product terms of power 11 (namely-$X_8Y_3$, $X_7Y_4$, and $X_6Y_5$); whereas array 10' forms three product terms of power 11 (namely-$X_3Y_8$, $X_4Y_7$, and $X_5Y_6$).

Within each array, the product terms are combined with the two-bit adders in the cells 2 and three-bit adders in the cells 3 to produce an intermediate result. That intermediate result from array 10 is labeled IR, and from array 10′ it is labeled IR′. In either case, the intermediate result consists of the partial sum of all of the product terms in an array such that no more than one carry remains to be added to each bit of the partial sum.

How the product circuits, two-bit adders, and three-bit adders are interconnected to produce this intermediate result is indicated in FIG. 1 by the arrows which are labeled P, C, and S. Each arrow labeled P indicates the coupling of a product term from one cell to another cell for addition; each arrow labeled C indicates the coupling of a carry term from one cell to another for addition; and each arrow labeled S indicates the coupling of a sum bit from one cell to another for addition.

For example, in array 10, the cell which forms product term $X_5Y_0$ (hereinafter cell $X_5Y_0$) has an arrow labeled P which goes to the cell that forms product term $X_4Y_1$ (hereinafter cell $X_4Y_1$). This indicates that the adder in cell $X_4Y_1$ adds the terms $X_4Y_1$ and $X_5Y_0$.

That results in a sum bit and carry bit from cell X4Y1, and they are transferred to two other cells as indicated by the arrow labeled S and the arrow labeled C. Specifically, the arrows show the sum bit gets transferred to the cell which forms the product term $X_3Y_2$ (hereinafter cell $X_3Y_2$) and the carry bit gets transferred to the cell which forms the product term $X_4Y_2$ (hereinafter cell $X_4Y_2$).

Cell $X_3Y_2$ is a type 3 cell which means it includes a three-bit adder. That adder adds the product term $X_3Y_2$ to the carry bit from cell $X_3Y_1$ and the sum bit from cell $X_4Y_1$. Similarly, cell $X_4Y_2$ is a type 3 cell which means it includes a three-bit adder. That adder adds the product term $X_4Y_2$ to carry bit from cell $X_4Y_1$ and sum bit from cell $X_5Y_1$.

After the intermediate results IR and IR′ are formed by arrays 10 and 10′ respectively, they are operated on by three parallel input adders 11, 12, and 13. More specifically, adder 11 receives in parallel all of the partial sum bits from array 10 together with all of the carry bits from array 10 and it adds them to produce a complete sum of the product terms in that array. Similarly, adder 12 adds the partial sum bits and carry bits from array 10′ to produce a complete sum of the product terms from that array; and adder 13 adds together the respective complete sums from adders 11 and 12 to produce a final result R which is the product of the two numbers X and Y.

Figure 2:
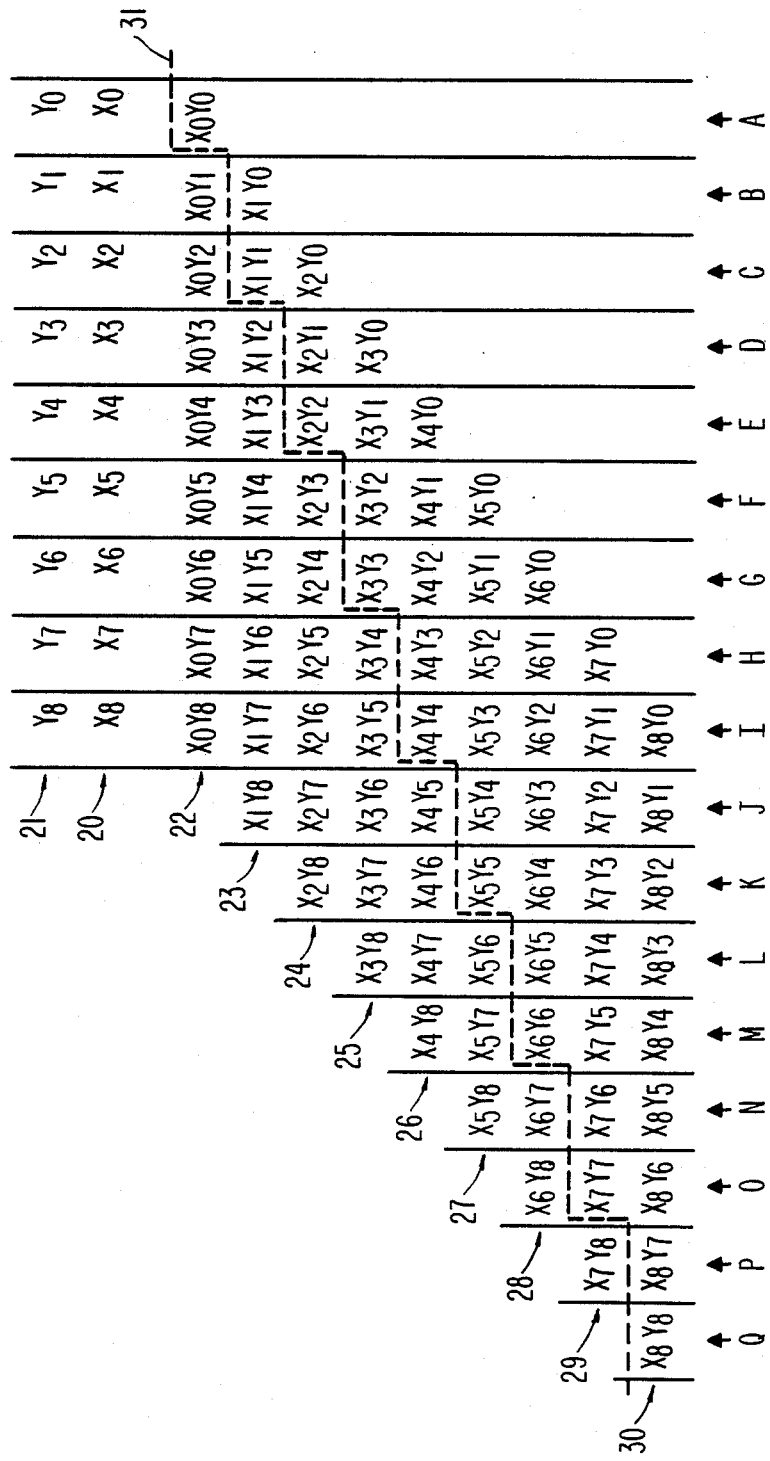
FIG. 2 is a schematic which helps explain the operation of the FIG. 1 embodiment.

Now to further understand the operation of the above described multiplier, reference should be made to FIG. 2. There, line 20 indicates the bits of number X; line 21 indicates the bits of number Y; and lines 22 thru 30 indicate the single power product terms which are obtained when all of the bits in number X are multiplied with all of the bits in number Y. Those terms which are below a dashed line 31 are formed by the cells in array 10; whereas the remaining terms are formed by the cells in array 10′.

Also in FIG. 2, the single power product terms are grouped in several columns which are labeled A thru Q; and in this grouping, all of the terms of any one column are the same power. Thus, for example, the terms in column A are of power 0; the terms in column B are of power 1; the terms in column C are of power 2; etc.

To form the product of the two numbers X and Y, all of the single power product terms in the columns A thru Q must be added together along with the carries which are generated by those additions. And in the FIG. 1 embodiment, the intermediate result IR from array 10 is the partial sum of all the terms in FIG. 2 which are below the dashed line 31; whereas the intermediate result IR′ from array 10′ is the partial sum of all the remaining product terms.

Also, arrays 10 and 10′ form their intermediate results at essentially the same time since they operate in parallel. Consequently, the final result R (that is-the final product of the two numbers X and Y) is formed in about half the time which it would take to add all of the single power product terms and their carries with a single array of two-bit and three-bit adders.

To amplify this point, consider the longest timing path which will occur if all of the product terms in FIG. 2 are added together with a single array of two-bit and three-bit adders. That longest timing path will include the addition of all of the terms in column I plus the propagation of any resulting carry through the remaining columns J, K, ... Q. Thus, the longest timing path will involve a total of eight adds plus a total of nine carries from column I through column Q.

By comparison, when the product terms of FIG. 2 are added via the arrays 10 and 10′ as described above, the longest timing path is essentially cut in half. In array 10, the longest timing path involves just four additions (the additions of terms $X_8Y_0$, $X_7Y_1$, $X_6Y_2$, $X_5Y_3$ and $X_4Y_4$). And in array 10′, the longest timing path involves just three additions (the additions of terms $X_0Y_8$, $X_1Y_7$, $X_2Y_6$, and $X_3Y_5$.

Note that since the number of additions in the longest timing path are so small, adder 11 in FIG. 1 preferably should include a carry look-ahead circuit. That would ensure that the carry through adder 11, to the partial sum of the column I terms which array 10 produces, occurs faster than the partial sum. Adder 11 should also include a carry look-ahead circuit to quickly propagate the carry, which array 10 generates by adding the last term in column I (term $X_4Y_4$), through the remaining higher order terms of the intermediate result. For similar reasons, adders 12 and 13 should also use carry look-ahead circuits.

Throughout the above description, the two numbers X and Y which were multiplied together each contained nine bits. However, by simply expanding the number of rows and columns in the arrays 10 and 10′, any number of bits in the numbers X and Y can be accommodated. If the numbers X and Y each contain n bits of power zero thru n−1, then the longest timing path through each of the arrays 10 and 10′ will involve the addition of the single power product terms of power n−1. And in each array, no more than (n−2)/2 such adds will occur when n is even; while no more than (n−1)/2 such adds will occur when n is odd.

Figure 3:
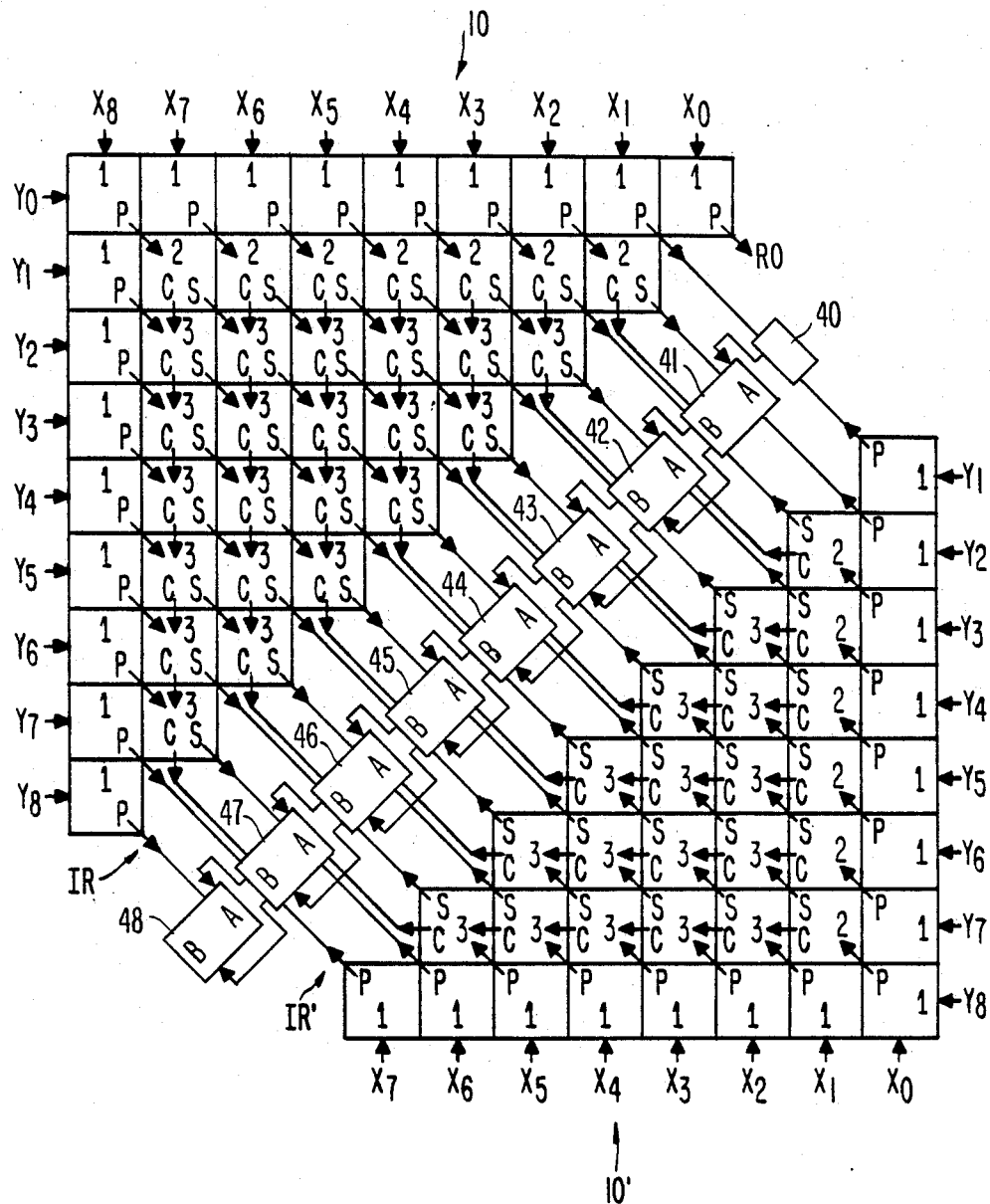
FIG. 3 illustrates another embodiment of the invention.

Turning now to FIG. 3, the details of another embodiment of the invention will be described. This embodiment is similar to the embodiment of FIG. 1 in that it also includes the previously described arrays 10 and 10′. However, in the embodiment of FIG. 3, the intermediate results IR and IR′ which the arrays 10 and 10′ form are added together by a serial string of a two-bit adder 40 and several dual four-bit adders 41 thru 48.

Each dual four-bit adder has two sets of input terminals A and B. There are four A input terminals which receive respective bits of the same power "i", and there are four B input terminals which receive four bits of the next power "i+i". Each dual four-bit adder produces two sum bits of powers i and i+1 by adding the bits which it receives on its A terminals and its B terminals; and it also produces two carry bits of powers i+2 and i+3. For simplicity, the sum bits are not shown; and the carry bits are shown as arrowed lines which leave the side of one module and go into an A terminal or B terminal of the next module.

With this embodiment of FIG. 3, the speed improvement which is obtained is essentially the same as that which was previously described in conjunction with FIGS. 1 and 2. This is because the arrays 10 and 10' again operate in parallel to produce the intermediate results IR and IR'. In producing those intermediate results, the longest timing path will again involve the addition of the no more than $(n-2)/2$ single power product terms of power $n-1$ when n is even, and no more than $(n-1)/2$ single power product terms of power $n-1$ when n is odd.

A wide variety of circuits can be used to implement the above described components which make up the embodiments of FIGS. 1 and 3; and the exact structure of those circuits is unimportant so long as they perform their required logic function. For example, the two-bit adder in the cells 2 of the arrays 10 and 10' need only perform the logic functions which are given by equations 1 and 2 below. There, $A_1$ and $A_2$ represent two binary bits of power i; $S_i$ represents the sum of power i; $C_{i+1}$ represents the carry of power $i+1$; and % represents an exclusive OR operation.

$$S_i = A_1 \% A_2 \quad \text{Eq.1}$$

$$C_{i+1} = A_1 A_2 \quad \text{Eq.2}$$

Similarly, the three-bit adder in the cells 3 of arrays 10 and 10' need only perform the logic functions which are given by equations 3 and 4 below. There, $A_1$, $A_2$, and $A_3$ represent three bits of power i; $S_i$ represents the sum of power i; $C_{i+1}$ represents the carry of power $i+1$; and % represents an exclusive OR operation. 2A indicates that any two of the bits $A_1$, $A_2$, and $A_3$ are a binary "1"; and 3A indicates that all three of those bits are a binary "1".

$$S_i = A_1 \% A_2 \% A_3 \quad \text{Eq.3}$$

$$C_{i+1} + 2A + 3A \quad \text{Eq.4}$$

Likewise, each of the dual four-bit adders 41 thru 48 need only perform the logic functions which are defined below by equations 5, 6, 7, and 8. There, the terms $A_1$, $A_2$, $A_3$, and $A_4$ represent four binary bits of power i on the A terminals of the module; $B_1$, $B_2$, $B_3$, and $B_4$ represent four binary bits of power $i+1$ on the B terminals of the module; $S_i$ represents the sum of power i; $S_{i+1}$ represents the sum of power $i+1$; $C_{i+2}$ represents the carry of power $i+2$; and $C_{i+3}$ represents the carry of power $i+3$. OA indicates that none of the bits $A_1$ thru $A_4$ are a binary "1"; 1A indicates that just one of the bits $A_1$ thru $A_4$ is a binary "1"; 2A represents that two of the $A_1$ thru $A_4$ bits are a binary "1", etc.

$$S_i = A_1 \% A_2 \% A_3 \% A_4 \quad \text{Eq.5}$$

$$S_{i+1} = B_1 \% B_2 \% B_3 \% B_4 \% (2A + 3A) \quad \text{Eq.6}$$

$$C_{i+2} = 0B4A + 1B(2A+3A) + 2B4A + 3B(A+1A) + 4B4A \quad \text{Eq.7}$$

$$C_{i+3} = 2B4A + 3B(2A+3A+4A) + 4B \quad \text{Eq.8}$$

Two preferred embodiments of the invention have now been described in detail. In addition, however, many changes and modifications can be made to the details of these embodiments without departing from the nature and spirit of the invention.

For example, the arrays 10 and 10' in the above embodiments form the single power product terms such that the total quantity of terms of any particular power in array 10 is within one of the total quantity of product terms of the same power in array 10'. However, significant parallelism can be obtained so long as the total quantity of product terms of any particular power in the respective arrays 10 and 10' are within 30% of each other.

Suppose, for example, array 10 has twenty terms of power $n-1$, and array 10' has twenty-five terms of that same power. Then the arrays would still operate in parallel for twenty of their adds.

Also, as another modification to the above described embodiments, the logic cells 1, 2, and 3 can be arranged in more than two arrays which will operate in parallel. Here again, the total quantity of single power product terms of any particular power in the respective arrays should be within 30% of each other. Each array would have its logic cells 1, 2, and 3 interconnected within the array to form an intermediate result which consists of a partial sum of the product terms in the array with no more than one remaining carry-in for each bit of that partial sum. These intermediate results would then be added together by parallel input adders.

For example, the multiplication of two binary numbers of forty bits each requires the generation of forty product terms of power 39. Those forty terms could be generated and summed via the cells 1, 2, and 3 in three arrays in groups of thirteen, thirteen, and fourteen; or they could be generated and summed via the cells 1, 2, and 3 in four arrays in groups of ten, ten, ten, and ten.

Such a multiplier circuit produces a product even quicker than a multiplier which generates and sums the terms via the cells 1, 2, and 3 in two arrays. However, they also take more chip space than a two array multiplier since they require more parallel input adders for the intermediate results as well as more room to route those results through the adders.

Accordingly, since many such modifications to the illustrated preferred embodiment can be made, it is to be understood that the invention is not limited to the details of those embodiments but is defined by the appended claims.

What is claimed is:

1. A circuit for multiplying two multibit binary numbers together, comprising:

a first array of a plurality of logic cells and a second array of a plurality of logic cells, with each array having input lines for receiving the bits of said numbers;

every logic cell including a product means for producing a product term of a single power by multiplying a bit of one of said numbers with a bit of the other number;

said cells being arranged such that the product means in said first array form one respective product term of each of the powers 0, 1, 2n, 2n−1, and form two respective product terms of each of the powers 2, 3, 2n−2, 2n−3, and form three respective product terms of each of the powers 4, 5, 2n−4, 2n−5, and so forth in the same sequence for all powers between 0 and 2n where n is the power of the most significant bit of said numbers; and wherein the respective product means in said second array form all remaining single power product terms;

adder means in selected cells of the first array which are interconnected to add the single power product terms of that array, and adder means in selected cells of the second array which are interconnected to add the single power product terms of that array in parallel with the adder means of the first array; and means for combining the results from the adder means of both arrays to produce the product of said numbers.

2. A circuit according to claim 1 wherein both of said arrays are integrated into a single semiconductor chip, wherein the cells of each array are arranged by rows and columns in respective triangular patterns which are space apart on the chip, and wherein said means for combining is disposed in the space between said patterns.

3. A circuit according to claim 2 wherein said means for combining includes a first parallel input adder for producing a complete sum of said product terms in said first array, a second parallel input adder for producing a complete sum of said product terms in said second array, and a third parallel input adder for adding the sums of said first and second parallel input adders.

4. A circuit according to claim 2 wherein said means for combining includes a plurality of dual four-bit adder stages, with each adder stage receiving partial sum and carry bits of two powers from both arrays and producing two sum bits and two carry bits for the next stage.

5. A multiplier circuit comprised of:
first and second arrays of logic cells, with each array having input lines for receiving two multibit binary numbers that are to be multiplied together;
each logic cell also including product means for producing a single power product term by multiplying together one bit from each of said two numbers;
one subset of said cells in both arrays further including a respective two-bit adder, and another subset of said cells in both arrays further including a respective three-bit adder;
said two-bit adders and said three-bit adders being interconnected within each array such that each array produces an intermediate result, in parallel with the other array, which consists of a partial sum of all product terms in an array and no more than one remaining carry-in for each bit of that partial sum; and
parallel input adders for combining the intermediate results from both arrays to product the product of said numbers; wherein
said product means of said first array and said product means of said second array are coupled to said input lines in a certain fashion such that each array produces substantially the same number of single power product terms of any particular power.

6. A circuit according to claim 5 wherein said first array produces a certain quantity of single power product terms of power k, wherein said second array produces another quantity of single power product terms of the same power k, and wherein said certain quantity and said another quantity differ by just one or are within 30% of each other, whichever is greater.

7. A circuit according to claim 5 wherein said parallel input adders include a first parallel input adder for producing a complete sum of said intermediate results from said first array; a second parallel input adder for producing a complete sum of said intermediate results from said second array; and a third parallel input adder for adding the sums of said first and second means.

8. A circuit according to claim 5 wherein said parallel input adders include a plurality of four-bit adder stages, with each adder stage receiving partial sum and carry bits of two powers in said intermediate results from both arrays and producing two sum bits and two carry bits for the next stage.

9. A circuit according to claim 5 wherein both of said arrays are integrated into a single semiconductor chip in respective triangular patterns which are spaced apart on the chip, and wherein said means for combining is disposed in the space between said patterns.

10. A multiplier circuit comprised of:
multiple arrays of logic cells, with each array having input lines for receiving two multibit binary numbers that are to be multiplied together;
each logic cell also including product means for producing single power product terms by multiplying together one bit from each of said two numbers;
one subset of said cells in each array further including a respective two-bit adder, and another subset of said cells in each array further including a respective three-bit adder;
said two-bit and said three-bit adders being interconnected within each array such that each array produces an intermediate result, in parallel with the other arrays, which consists of a partial sum of all product terms in an array and no more than one remaining carry-in for each bit of that partial sum; and
means for combining the intermediate results from all arrays to produce the product of said numbers; wherein
said product means of each array being coupled to said input lines in a certain fashion such that the number of single power product terms of any particular power which each array produces differ by just one or are within 30% of each other, whichever is greater.

* * * * *